3,297,658
FLAME RESISTANT POLYMER COMPOSITIONS
Lieng-Huang Lee, Midland, Mich., assignor to The Dow Chemical Company, Midland, Mich., a corporation of Delaware
No Drawing. Original application Sept. 5, 1962, Ser. No. 262,314. Divided and this application June 25, 1965, Ser. No. 467,139
2 Claims. (Cl. 260—78.5)

This is a divisional application of Serial No. 262,314, filed September 5, 1962, now abandoned.

This invention relates to flame-resistant plastic polymerization products. More particularly, it relates to certain bromoethyl esters of itaconic acid copolymerized with one or more polymerizable ethylenically unsaturated compounds to form resinous, thermoplastic polymers which are highly resistant to burning.

It is known that the halogen content of halogenated organic compounds often has an effect of reducing the flammability both of the compound containing the halogen and a flammable organic material intimately admixed or polymerized therewith. It is also known that bromine containing compounds possess, in most instances, a greater flame retarding action than do corresponding chlorine containing compounds. However, the organic bromides differ widely among themselves in effectivness as flame retarding agents. Also, many organic bromides are excessively unstable to light and cause pronounced discoloration and degradation of plastic compositions comprising the same, on standing, or during fabrication of the composition.

It has now been found that the esters prepared by the interaction of 2-bromoethyl alcohol and itaconic acid or itaconic anhydride are highly stable materials which are particularly useful for the preparation of interpolymers having desirable flame resistance.

The invention includes the compounds having the formula:

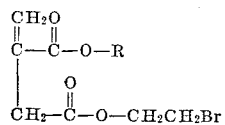

wherein R is —CH₂CH₂Br or H. The invention also includes copolymers or interpolymers formed by polymerizing the 2-bromoethyl itaconates of the present invention with at least one polymerizable ethylenically unsaturated compound which is capable of forming a resinous, thermoplastic material.

The di(2-bromoethyl) itaconate of the present invention is conveniently prepared by reacting itaconic acid with 2-bromoethyl alcohol. Although it is recognized that virtually any proportions of reactants will effect formation of some of the desired product, molar ratios of the 2-bromoethyl alcohol with itaconic acid of at least about 2 to 1 and preferably 3 to 1 are generally preferred.

The 2-bromoethyl acid itaconate is advantageously prepared by reaction of approximately equimolar amounts of the required 2-bromoethyl alcohol with the anhydride of itaconic acid.

The herein described reactions are suitably carried out in a low boiling solvent, such as benzene, on a water bath or an oil bath at temperatures ranging from about 80 to 150° C. The reaction is advantageously conducted under a reflux condenser to prevent volatilization of the solvent and/or reaction constituents, until substantial maximum conversion is achieved; normally from 10 to 65 hours are sufficient. A small amount of catalyst such as para-toluene sulfonic acid may advantageously be employed to increase the rate and completeness of reaction, and is particularly advantageous for preparation of the di(2-bromoethyl) itaconate described herein.

The 2-bromoethyl itaconates of the persent invention are light colored liquids or solids which are difficultly homopolymerized, but which easily undergo copolymerization with various other polymerizable ethylenically unsaturated compounds to form thermoplastic polymeric materials having highly desirable flame-resistant properties.

Additionally, the bromoethyl itaconates of the present invention possess excellent stability to heat at elevated temperature, for example, for temperatures as high as 300° C. There is, therefore, little or no discoloring or yellowing of the polymeric compositions described herein, resulting from deterioration of the bromoethyl itaconate substituent of the polymeric composition.

Exemplary of the compounds with which the bromoethyl itaconates of the persent invention are advantageously copolymerized, are those polymerizable alkenyl aromatic compounds having the formula:

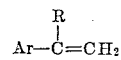

wherein Ar represents an aromatic hydrocarbon radical, or an aromatic halohydrocarbon radical, of the benzene series, and R is hydrogen or the methyl radical. Illustrative of such compounds are: styrene, alpha-methylstyrene, vinyltoluene, ar-ethylstyrene, vinylxylene, ar-chlorostyrene, ar-isopropylstyrene, ar-tert-butylstyrene, and comonomeric mixtures of the above with each other or with other readily polymerizable compounds including, among many others; the olefinic hydrocarbons such as ethylene, propylene, 1,3-butadiene and the like; vinyl esters such as the esters of acrylic and methacrylic acids, vinyl acetate, vinylidene chloride, vinyl chloride, and the like; olefinic acids including acrylonitrile, acrylic and methacrylic acids, maleic and fumaric acids; alkenyl ketones such as vinyl methyl ketone and isopropenyl methyl ketone; and olefinic alcohols such as allyl alcohol and methally alcohol.

Such polymerization may be accomplished in bulk, in solution, in emulsion, or in the presence of ultraviolet light using procedures which are well known in the art.

It is further to be recognized that the bromoethyl itaconates of the present invention may suitably be admixed with polymers or interpolymers of the materials described herein, to provide polymeric compositions having enhanced flame-resistance properties.

Generally, best results are obtained when the bromoethyl itaconates of the present invention are present, either in polymerically combined form or as an additive to a polymeric composition, in amounts sufficient to provide at least about 5 weight percent bromine based on the total weight of such interpolymer or polymeric composition.

The following examples wherein all parts and percentages are to be taken by weight, illustrate the invention but are not to be construed as limiting its scope.

*Example 1*

The preparation of di(2-bromoethyl) itaconate was accomplished by placing in a one liter glass reaction flask a mixture consisting of 130 grams (1 mole) of itaconic acid and 275 grams (2.2 moles) of 2-bromoethanol, with 5 grams of para-toluene sulfonic acid and 200 milliliters of benzene. The mixture was then heated at reflux for a period of about 26 hours. Following completion of reaction, the benzene was removed by distillation under atmospheric pressure, and the product obtained by distillation of the crude reaction mixture under vacuum. A yield of 125 grams of di(2-bromoethyl) itaconate having a boiling point of 148° C. under 0.4 milliliter of mercury, and having a refractive index of 1.5155 at 25° C. was obtained:

*Example II*

The preparation of 2-bromoethyl acid itaconate was accomplished by placing in a one liter glass reaction flask a mixture consisting of 56 grams (0.5 mole) of itaconic anhydride and 62.5 grams (0.5 mole) of 2-bromoethanol, with 5 grams of para-toluene sulfonic acid and 200 milliliters of benzene. The mixture was then heated at reflux for a period of about 30 hours. Following completion of reaction, the benzene was removed by distillation under atmospheric pressure to yield a solid light yellow crude reaction product, which was subsequently recrystallized in normal hexane to yield 19 grams of a white solid having a melting point of 67° C.

*Example III*

In each of a series of experiments, the di(2-bromoethyl) itaconate of Example I was placed in a glass bomb tube with at least one of the polymerizable ethylenically unsaturated compounds as described herein and in the presence of 0.05 gram of benzoyl peroxide. Each of such tubes was then individually sealed under nitrogen and the monomeric materials caused to polymerize by heating the tubes in a constant temperature oil bath at 100° C. for between 2 and 3 days, and at 150° C. for one day. Following completion of polymerization, each of the so-formed polymeric materials was individually dispersed in methylene chloride and subsequently precipitated by adding the methylene chloride dispersion to methanol. The precipitated polymeric materials were then separately dried over night at a temperature between 70 and 80° C. under reduced pressure and then compression molded into test bars about 6 inches in length, 1 inch wide, and ¼ inch thick. The flame-resistant properties of each polymeric test bar were then determined, essentially as described by A.S.T.M. Method D-635-44.

The following Table I illustrates the monomeric composition and flame-resistant properties of each of such polymeric materials.

TABLE I

| Run No. | Monomer Composition, Grams | | | | Flame resistant properties of polymer |
|---|---|---|---|---|---|
| | Di(2-bromo-ethyl) ita-conate | Styrene | Acrylo-nitrile | Methyl methac-rylate | |
| 1 | 34.4 | 165.6 | 80.0 | | Would not burn. |
| 2 | 34.4 | 93.0 | | 172.6 | Do. |

The advantageous flame-resistant properties of the polymeric compositions of the present invention are readily apparent from the results reported on Table I. Similar good results are obtained wherein the 2-bromoethyl acid itaconate of the present invention is copolymerized as described herein, in amounts sufficient to provide at least about 5 weight percent bromine, based on the total weight of the interpolymers.

What is claimed is:

1. A non-flammable thermoplastic polymeric composition consisting essentially of an essentially linear interpolymer prepared by the interpolymerization by free radical means of about 60 parts styrene, about 28 parts of acrylonitrile and about 12 parts of di(2-bromoethyl) itaconate.

2. A non-flammable thermoplastic polymeric composition consisting essentially of an essentially linear interpolymer prepared by the interpolymerization by free radical means of about 30 parts styrene, about 58 parts methyl methacrylate and about 12 parts of di(2-bromoethyl) itaconate.

References Cited by the Examiner

UNITED STATES PATENTS 2,279,882  4/1942  D'Alelio _____ 260—485
2,619,477  11/1952  Banes _____ 260—78.5
3,151,183  9/1964  Bill et al. _____ 260—485

JOSEPH L. SCHOFER, *Primary Examiner.*

L. WOLF, L. G. CHILDERS, *Assistant Examiners.*